United States Patent
Pajard et al.

(10) Patent No.: US 11,401,863 B2
(45) Date of Patent: Aug. 2, 2022

(54) CENTRIFUGAL DEAERATOR FOR A TURBOMACHINE

(71) Applicant: SAFRAN HELICOPTER ENGINES, Bordes (FR)

(72) Inventors: Jean-Pierre Pajard, Moissy-Cramayel (FR); Yannick Cazaux, Moissy-Cramayel (FR); Benjamin Fulleringer, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 520 days.

(21) Appl. No.: 16/494,707

(22) PCT Filed: Mar. 7, 2018

(86) PCT No.: PCT/FR2018/050528
§ 371 (c)(1),
(2) Date: Sep. 16, 2019

(87) PCT Pub. No.: WO2018/172646
PCT Pub. Date: Sep. 27, 2018

(65) Prior Publication Data
US 2020/0011246 A1    Jan. 9, 2020

(30) Foreign Application Priority Data

Mar. 21, 2017 (FR) ..................... 1752305

(51) Int. Cl.
*B04B 5/10* (2006.01)
*F02C 7/06* (2006.01)
(Continued)

(52) U.S. Cl.
CPC ............ *F02C 7/06* (2013.01); *B01D 39/2051* (2013.01); *B01D 45/16* (2013.01);
(Continued)

(58) Field of Classification Search
CPC ....... F02C 7/06; B01D 39/2051; B01D 45/16; B01D 46/0031; B01D 50/20; B04B 5/005;
(Continued)

(56) References Cited

U.S. PATENT DOCUMENTS 5,716,423 A    2/1998 Krul et al.
6,033,450 A *  3/2000 Krul ...................... B01D 45/14
                                              55/438
(Continued)

FOREIGN PATENT DOCUMENTS

FR    3007463 A1    12/2014

OTHER PUBLICATIONS

International Search Report received for PCT Patent Application No. PCT/FR2018/050528, dated Jun. 25, 2018, 7 pages (3 pages of English Translation and 4 pages of Original Document).

*Primary Examiner* — Dung H Bui
(74) *Attorney, Agent, or Firm* — Womble Bond Dickinson (US) LLP

(57) ABSTRACT

The invention relates to a centrifugal deaerator for an air/oil mixture of a turbomachine, comprising: an annular housing (10) for the centrifugal separation of said mixture, arranged around a hollow shaft (11); axial inlets (14) for the flow of said air/oil mixture into said housing (10); a pinion (20) for rotating said housing (10); and radial oil outlets (15) and oil-free air outlets (16), characterised in that it comprises a metal foam (50) housed in said housing (10) by partially extending along the axial direction (XX') so as to define two successive spaces, a foam-free space (51) and a foam-lined space (52), said foam-free space opening up towards said axial inlets. A device can be advantageously added to the
(Continued)

Figure 1:
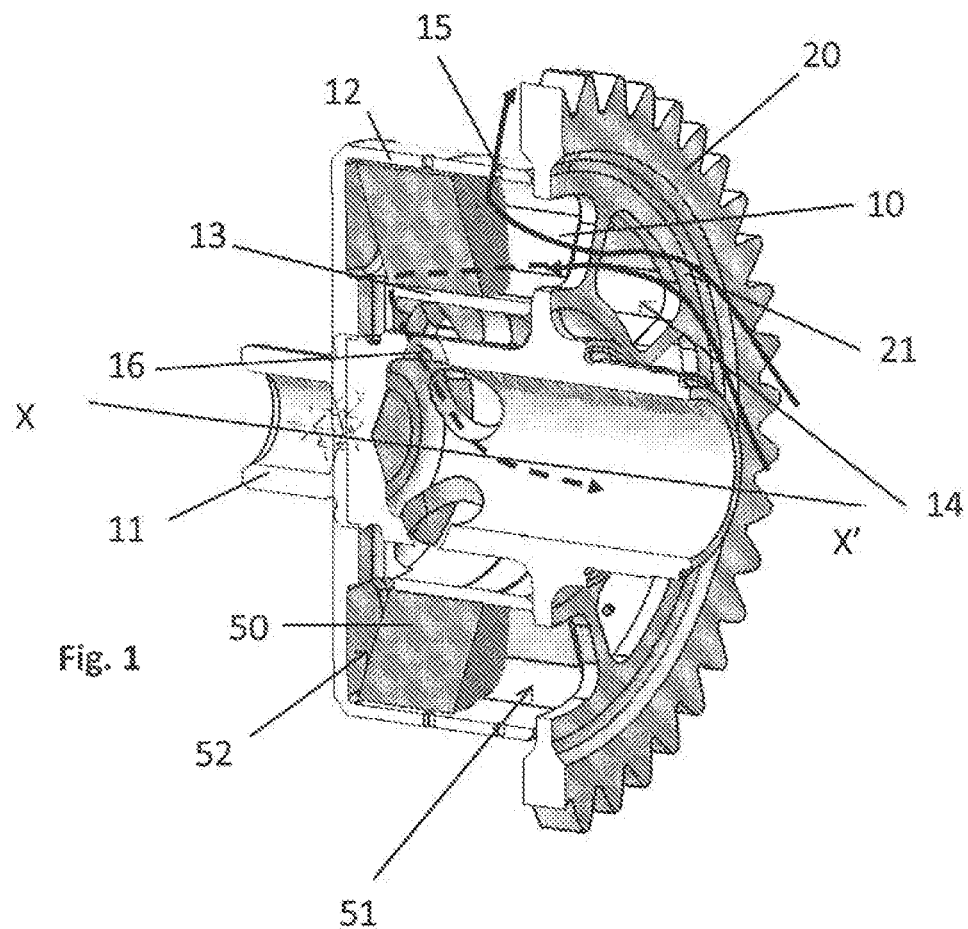

hollow shaft in order to reduce the free-vortex phenomenon and to thereby significantly reduce the load losses of the deaerator.

7 Claims, 2 Drawing Sheets

(51) Int. Cl.
 B01D 39/20 (2006.01)
 B01D 45/16 (2006.01)
 B01D 46/00 (2022.01)
 B04B 5/00 (2006.01)
 B04B 5/08 (2006.01)
 B01D 50/20 (2022.01)

(52) U.S. Cl.
 CPC ......... *B01D 46/0031* (2013.01); *B01D 50/20* (2022.01); *B04B 5/005* (2013.01); *B04B 5/08* (2013.01); *F05D 2220/30* (2013.01); *F05D 2260/609* (2013.01)

(58) Field of Classification Search
 CPC . B04B 5/08; F05D 2220/30; F05D 2260/609; Y02T 50/60
 See application file for complete search history.

(56) References Cited

U.S. PATENT DOCUMENTS

| | | | |
|---|---|---|---|
| 6,398,833 B1* | 6/2002 | Santerre | B01D 45/12 55/525 |
| 6,858,056 B2* | 2/2005 | Kwan | B01D 46/12 55/400 |
| 8,657,931 B2* | 2/2014 | Short | F01M 13/04 55/408 |
| 8,945,284 B2* | 2/2015 | Short | F01D 25/183 55/408 |
| 9,028,576 B2* | 5/2015 | Slayter | F02C 7/32 55/408 |
| 10,537,842 B2* | 1/2020 | Parikh | B01D 45/14 |
| 2015/0000246 A1* | 1/2015 | Beier | F01D 25/18 60/39.08 |
| 2015/0007531 A1 | 1/2015 | Beier et al. | |
| 2015/0176447 A1* | 6/2015 | Beier | F01M 13/04 415/110 |
| 2015/0321130 A1* | 11/2015 | Beier | F01D 25/18 96/306 |
| 2016/0158679 A1* | 6/2016 | Beier | F02C 7/06 55/462 |
| 2016/0208650 A1* | 7/2016 | Craig | B01D 46/62 |
| 2017/0145858 A1* | 5/2017 | Blumrich | F16K 1/38 |

* cited by examiner

CENTRIFUGAL DEAERATOR FOR A TURBOMACHINE

1. TECHNICAL FIELD OF THE INVENTION

The invention relates to a centrifugal deaerator for a turbomachine.

2. TECHNOLOGICAL BACKGROUND

The state of the art comprises, in particular, patent applications published under the numbers US-A1-2015/007531, FR-A1-3 007 463 and US-A1-2016/208650, as well as U.S. Pat. No. 5,716,423.

Turbomachines are complex systems which implement a certain number of rotating assemblies (turbines, compressor, etc.) which must be equipped with sealing devices. These sealing devices are generally produced by pressurized air labyrinths arranged in the vicinity of the rotating assembly. To do this, an air is taken directly in the air duct of the turbomachine. This air then transits in the turbomachine by the different labyrinths provided for this purpose, then is evacuated towards the outside of the turbomachine to limit the increase in pressure of the other zones of the turbomachine, in particular the reduction gear, the accessory box, etc. However, this air having passed through different zones of the turbomachine, it is loaded with oil used for the cooling and the lubrication of bearings and pinions of the rotating assemblies. To avoid the oil-loaded air discharge, easing the ecological impact of turbomachines, reducing the oil consumption and limiting the filling operations of the oil reserves, it is important to provide deaerators which allow separating oil from air before evacuating air towards the outside of the turbomachine.

Such a deaerator is generally arranged and driven by a mechanical power take-off at the level of the accessory box or the reduction gear of the turbomachine.

In a known manner, such a centrifugal deaerator comprises one or more housings for centrifugal separation of the air/oil mixture arranged around a hollow shaft and delimited by an outer annular wall and an inner annular wall. The deaerator further comprises an axial inlet for providing the housing with the air/oil mixture, and a peripheral oil outlet arranged in the outer wall. Thus, during the rotating of the deaerator, obtained generally by way of a pinion of the accessory box or of the reduction gear, the oil is naturally driven by centrifugal force towards the oil outlet arranged in the periphery of the deaerator. A de-oiled air outlet is furthermore arranged in the inner wall and connected to the hollow shaft, which enables to evacuate air towards the outside.

Certain deaerators further comprise filters arranged in the housing of the deaerator to improve the capturing of oil drops and to thus favour the de-oiling of the mixture. Indeed, the filters increase the contact surface available and therefore improve the probability that an oil drop transported by the mixture flow is attached to a wall. These filters are generally formed of a metal foam.

One of the disadvantages, however, of these metal form deaerators resides in the fact that at high speed (for example, for speeds of around 6000 revolutions per minutes) and even more so at a very high speed (for example, for speeds of around 25,000 revolutions per minutes), the front surface constituted by the metal foam acts as a wall and the degree of penetration of the air particles in the foam is low. This comes out as substantial load losses at a high speed, that the secondary air system of the turbomachine cannot support with the associate risk of leakage by the sealings of the generator. In order to compensate for load losses, the flow of the secondary air system can be increased in order to guarantee the sealings, with however an increased removal in the duct and therefore an impact on the performance of the generator.

The inventors have therefore sought to improve the performance of known deaerators, in particular reducing load losses of the deaerator, in particular at a high speed. Thus, the secondary air system flow needs are decreased, consequently with an improvement of the engine performance and a decrease of the airflow to be processed. Thus, the oil consumption can be reduced. The consumption of turbomachines remains a major area of improvement. This must allow optimising the quantity of oil on board and therefore to reduce the mass of the turbomachine. This must also allow increasing the duration of the missions. This must also reduce the maintenance operations on the turboshafts. Finally, this must allow improving the ecological impact of the turboshafts.

3. AIMS OF THE INVENTION

The invention aims to provide a deaerator which overcomes at least some of the disadvantages of known deaerators.

The invention aims in particular to provide, in at least an embodiment, a centrifugal deaerator of a turbomachine which presents improved performance with respect to known deaerators.

The invention also aims to provide, in at least an embodiment, a deaerator which conserves good performance (low load losses and low oil consumption) at high or very high speed.

4. SUMMARY OF THE INVENTION

To do this, the invention relates to a centrifugal deaerator for an air/oil mixture of a turbomachine comprising:
- an annular housing for the centrifugal separation of said mixture arranged around a hollow shaft extending along a direction, so-called axial direction, and delimited by an outer annular wall and an inner annular wall,
- at least one axial inlet of said air/oil mixture in said housing,
- a pinion for rotating said housing comprising a web securely connected to said inner and outer annular walls such that a rotation of said pinion drives said housing in rotation,
- at least one radial oil outlet arranged in said outer wall and configured to be able to evacuate the oil separated from said mixture towards the outside of the deaerator,
- at least one de-oiled air outlet arranged in said inner wall and configured to be able to evacuate the de-oiled air towards said hollow shaft.

A deaerator according to the invention is characterised in that it comprises a metal foam housed in said housing by partially extending along said axial direction so as to delimit two successive spaces along the axial direction, a foam-free space and a foam-lined space, said foam-free space opening onto said axial inlet(s).

A deaerator equipped with a metal foam, such as a foam commercialised under the name Retimet®, allows forming a potential substantial contact surface with the air/oil mixture which allows improving the probability of capturing an oil particle which is then centrifugated outside of the deaerator. These foams act as a filter. Furthermore, the centrifugal effect allows avoiding the saturation of filters by the continuous evacuation of oil drops attached to the filters.

According to the invention, the metal foam extends along the axial direction, only partially in said housing so as to delimit two separate and attached spaces, a foam-free space and a foam-lined space. The foam-free space extends between the axial inlets and the foam-lined space. The foam-free space favours the suctioning of the air/oil mixture to be separated and contributes to the separation of drops with a large diameter, while the foam-lined space favours the capturing of the remaining oil particles to evacuate through the centrifugal housing. In other words and according to the invention, the metal foam does not fully fill the housing of the deaerator, but only one portion of the housing. A first portion in the vicinity of the axial mixture inlets is left foam-free and a second portion in the vicinity of the bottom of the housing, i.e. arranged axially opposite the inlets, is filled with metal foam.

This specific architecture of the deaerator allows the air/oil mixture to enter into the deaerator through the axial inlets and circulate axially in the foam-free space without notable load losses. In this first space, a first de-oiling phase is carried out by the movement of large-diameter oil drops towards the periphery of the housing under the effect of the centrifugal force. The second space of the housing is lined with metal foams which are axially attacked by air and the remaining oil drops (i.e. of a smaller diameter), thus limiting the load losses. The oil drops captured by the foams are then centrifugated towards the periphery of the housing.

Advantageously and according to the invention, said metal foam presents a variable thickness—for example decreasing—between the inner wall and the outer wall of the housing so as to standardise the load losses between the zones close to the inner wall little subjected to the centrifugal force and the zones close to the outer wall highly subjected to the centrifugal force.

Given the architecture of a deaerator according to the invention, the shortest path for air between the inlet and the de-oiled outlet is that passing through the foam base, i.e. in the vicinity of the hollow shaft. Air therefore tends to pass through this low portion, which is furthermore, less subjected to the centrifugal force than the portions close to the periphery of the housing. To limit this phenomenon, this variant provides a modification of the geometry of the foam between the low portion of the foam (i.e. that in the vicinity of the inner wall) and the low portion of the foam (i.e. that in the vicinity of the outer wall), which allows better distributing the air passage and to standardise the load losses. The flow is thus better distributed and the speeds of the mixture are more homogenous. The oil which rises in the metal foams also tends to form bigger and bigger drops, which increases the oil concentration in the foams in the vicinity of the periphery of the housing. The shape of the filter also allows facilitating the draining of the oil contained in the filter.

Advantageously and according to the invention, each de-oiled air outlet is free of metal foam.

This variant allows avoiding a "bottleneck" effect in the vicinity of the de-oiled air outlets and therefore to avoid an increase of the speeds in the metal foam in the vicinity of the de-oiled air outlets, which would otherwise translate themselves by an increase in load losses.

Advantageously and according to the invention, said housing is formed of a plurality of compartments arranged radially around the hollow shaft, each compartment being supplied in mixture by an axial mixture inlet, being connected to one or more radial oil outlet(s) and to an de-oiled air outlet, each compartment comprising two successive spaces along the axial direction, a foam-free space and a foam-lined space, said foam-free space opening onto said axial inlet.

According to this variant, the housing of the deaerator is divided into a plurality of compartments, each compartment being connected to an axial inlet of the mixture to be able to be provided with mixture, one or several radial oil outlet(s) to be able to evacuate oil outside of the deaerator, and one or several de-oiled air outlet(s) to be able to evacuate de-oiled air towards the hollow shaft. These compartments are evenly distributed around the hollow shaft. This allows improving the de-oiling of the mixture by forming a plurality of centrifugal sub-housings for separating the mixture. Furthermore, each compartment presents the two successive spaces of the housing, namely a foam-free space to favour the suctioning of the air/oil mixture to be separated and a foam-lined space to favour the capturing of oil drops.

Despite these precautions, the use of a filter, typically of the metal foam type, tends to increase the load losses of the deaerator.

When the rotational speeds are substantial, the mixture acquires, in the air cells of the foam, substantial kinetic momentum. By orienting towards the outlet, the de-oiled air orients itself centripetally and the angular speed increases to conserve this kinetic momentum. This results in angular speeds, and therefore very substantial flow speeds in the hollow shaft of the deaerator. This significantly affects the load losses, in particular in high-speed applications.

Advantageously, to compensate the load losses connected to the use of filters or to reduce the load losses of a simple centrifugal deaerator, a vortex inhibitor is housed in the hollow shaft. This inhibitor can be added by gluing, screwing or interference fitting in particular, and constitutes a simple and easily integrable part in the hollow shaft. This variant thus allows reducing the load losses of a centrifugal deaerator with or without Retimet®, and therefore improving the performance of it. The vortex inhibitor can comprise flow recovery blades.

Advantageously according to the invention, said axial mixture inlet(s) and said radial oil outlet(s) are arranged axially on either side of said web of said pinion so as to prevent any reintroduction of oil evacuated by said radial oil outlet(s) in the housing through said axial mixture inlet(s).

A deaerator according to this variant of the invention allows segregating the air/oil mixture inlet flows of the oil evacuation flows by cleverly arranging the mixture inlets and the oil outlets with respect to the web of the pinion for rotating the deaerator. This arrangement provides that the mixture inlets and the oil outlets are axially arranged on either side of the web of the pinion. This therefore allows limiting, to the maximum, the reintroduction of oil evacuated through the radial oil outlets directly in the mixture present at the inlet of the deaerator. In other words, the web of the pinion acts as a separation wall between the mixture at the inlet of the deaerator and the oil evacuated through the radial oil outlets. Furthermore, when functioning, the pinion being in rotation, the teeth of the pinion generate, through air mixing, an air wall which surrounds the pinion and which therefore contributes also to limit the passage of the oil evacuated by the radial outlets towards the axial mixture inlets arranged on either side of the pinion. The pinion can be arranged axially at any point between the mixture inlets and the oil outlets. In particular, it can be arranged in the proximity of the mixture inlets or in the proximity of the oil outlets, centred or not.

This specific arrangement of the mixture inlets and of the oil outlets allows limiting the phenomenon of re-introducing oil into the mixture, which improves the de-oiling performance of the air/oil mixture. This improvement of performance allows optimising the quantity of oil embedded in the turbomachines and therefore reducing the mass of the turbomachine. This consequently allows improving the ecological impact of a turboshaft equipped with a deaerator according to the invention.

Advantageously, a deaerator according to the invention further comprises at least one anti-return disc extending perpendicularly to the outer wall and partially blocking said axial mixture inlet(s) in the housing so as to prevent an oil outlet in the vicinity of said outer wall through said axial mixture inlet(s).

According to this variant, the housing comprises an anti-return disc which acts as a wall preventing the oil outlet through the inlet of the mixture. In particular, when functioning, the housing is rotated by way of the pinion. The oil is thus driven by the centrifugal acceleration towards the outer wall of the housing. In the vicinity of the outer wall, before the evacuation of oil through the radial outlets, the oil forms an oil film which extends over the inside of the outer wall. To avoid this film sliding over the inside of the outer wall and emerging through the axial mixture inlets, the invention according to this variant provides a disc which blocks at the level of the outer wall of the oil passage. This therefore allows avoiding the mixture at the inlet of the housing being enriched by the oil extracted from the mixture during the processing by the deaerator.

Advantageously and according to this variant, the anti-return disc is formed by a portion of the web of the pinion arranged upstream of said housing and surrounding the axial mixture inlets.

According to this variant, the web of the pinion is arranged upstream of said housing. Furthermore, it is contributed to form the anti-return disc.

Advantageously and according to this variant, said web of said pinion comprises access openings to said axial inlet(s) of the mixture in the housing.

The pinion being arranged upstream of the housing, the web comprises advantageously openings allowing the mixture accessing the housing.

The invention also relates to a turboshaft comprising a mechanical member of the accessory box or reduction gear type, characterised in that it comprises a deaerator according to the invention adapted to be driven in rotation by said mechanical member.

A turboshaft according to the invention equipped with a deaerator according to the invention therefore consumes less oil than a turboshaft of the prior art by an improved oil recovery. A turboshaft according to the invention presents a lighter weight than a turboshaft of the prior art. The duration of a mission of a helicopter equipped with turboshafts according to the invention is therefore longer. Furthermore, the maintenance operations are less frequent. Finally, the ecological impact of a turboshaft according to the invention is better than that of the turboshafts of the prior art.

The invention also relates to a deaerator and a turboshaft characterised in combination by all or some of the features mentioned above or below.

5. LIST OF FIGURES

Figure 2:
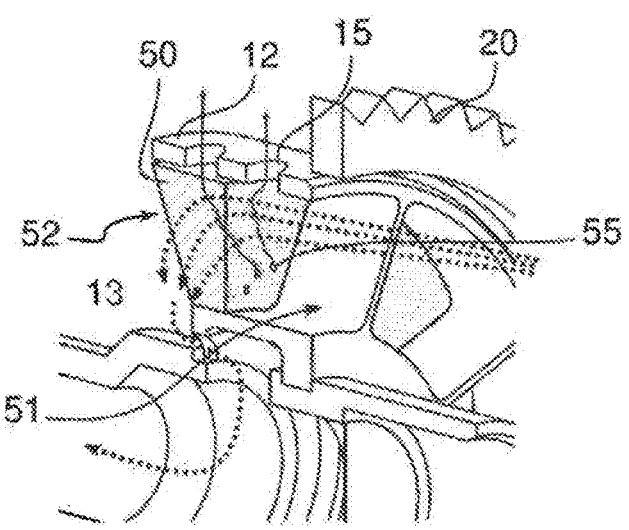
Figure 3:
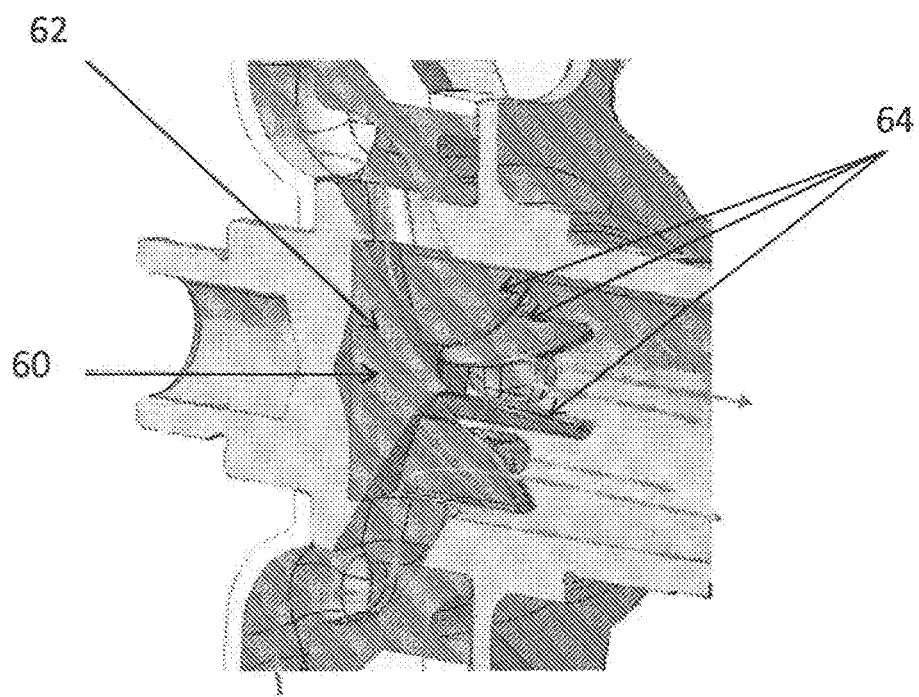

Other aims, features and advantages of the invention will appear upon reading the following description given only in a non-limiting manner and which refers to the appended figures, wherein:

FIG. 1 is a schematic, perspective and cross-sectional view along a symmetrical plane of a deaerator according to an embodiment of the invention, FIG. 2 is a partial, schematic, perspective and cross-sectional view along a symmetrical plane of the deaerator of FIG. 1 highlighting the functioning principle of this deaerator, and FIG. 3 is a schematic, perspective and cross-sectional view along a symmetrical plane of a deaerator according to an embodiment variant of the invention.

6. DETAILED DESCRIPTION OF AN EMBODIMENT OF THE INVENTION

In the figures, the scales and proportions are not strictly adhered to and this, for purposes of illustration and clarity.

A deaerator according to the invention comprises, such as represented in FIG. 1, an annular housing 10 for the centrifugal separation of an air/oil mixture arranged around a hollow shaft 11. This annular housing 10 is delimited by an outer annular wall 12 and an inner annular wall 13. This housing 10 comprises a plurality of deaerating compartments distributed around the hollow shaft 11.

The deaerator further comprises a plurality of axial inlets 14 allowing the air/oil mixture to enter into the housing 10. Each compartment of the housing 10 is connected to an axial inlet 14 such that each compartment can receive a mixture to be separated by a dedicated inlet.

The deaerator further comprises a plurality of radial oil outlets 15 arranged in the outer wall 12 and configured to be able to evacuate the oil separated from the mixture by the effect of the centrifugal force of the deaerator. Each compartment of the housing 10 is connected to one or more radial oil outlet(s) 15.

The deaerator further comprises a plurality of de-oiled air outlets 16 arranged in the inner wall 13 and configured to be able to evacuate the de-oiled air towards the hollow shaft 11. Each compartment of the housing 10 is connected to at least one de-oiled air outlet 16.

Finally, the deaerator comprises a pinion 20 for rotating the housing 10 comprising a web 21 securely connected to the hollow shaft 11 and to the inner 13 and outer 12 annular walls.

A deaerator according to the invention further comprises metal foams 50 arranged in each compartment of the housing 10. These foams are, for example, foams commercialised under the brand Retimet®. They allow improving the effectiveness of the deaerator by increasing the probability of capturing oil particles.

According to the invention, the metal foams 50 do not fully extend in the compartments, but only extend over an axial portion of each compartment so as to form two separate successive spaces in the compartment: a foam-free space 51 and a foam-lined space 52. The foam-free space 51 is provided with mixture through the axial inlets 14 and it opens into the foam-lined space 52. The foam-lined space 52 opens into the peripheral oil outlets. The foam-free space 51 thus presents a simple centrifugal function of the deaerator allowing the oil/air mixture to enter into the housing 10 of the deaerator, then to axially move in a rotating marker. During this movement, a first de-oiling phase is carried out. The foam-lined space 52 presents a function for capturing oil drops not extracted during the first phase. This second de-oiling phase is furthermore carried out in the foam-lined space 52 without notable load losses due to the axial attack of the oil drops. In addition, the separation of the housing between a foam-free space and a foam-lined space allows avoiding the saturation of metal foams of the foam-lined space by a first de-oiling phase in the foam-free space. The inventors have realised that this architecture allows providing results which combine low load losses of the deaerators, totally foam-free, and the good separation of deaerators, totally foam-lined. In other words, the two spaces cooperate to provide a result which goes beyond the sum of the results of each of the two spaces taken individually.

According to an advantageous embodiment represented in FIG. 2, the metal foams present, in each compartment, a variable thickness between the inner wall 13 and the outer wall 12, which allows standardising the load losses between the zones close to the inner wall 13 which are not highly subjected to the centrifugal force and the zones close to the outer wall 12 highly subjected to the centrifugal force.

FIG. 2 also schematically illustrates the movement of oil drops 55 in a metal foam. The oil drops 55 are captured by the foam 50 and move towards the periphery of the deaerator due to the centrifugal force resulting from the rotating of the housing by way of the pinion 20. However, the de-oiled air is naturally evacuated towards the hollow shaft 11 of the deaerator.

The deaerator according to the embodiment of the figures further comprises axial mixture inlets 14 and radial oil outlets 16 arranged axially on either side of the web 21 of the pinion 20.

This specific arrangement of the inlet 14 and of the outlets 16 with respect to the web 21 of the pinion 20 allows preventing any reintroduction in the housing of oil evacuated through the radial outlets. In particular, the oil evacuated through the outlets 15, formed by orifices in the outer wall 12, cannot be directed towards the inlets 14 because the pinion 20 acts as a separation wall. Furthermore, the rotation of the pinion generates an air wall which prevents the oil circulation towards the inlets 14. Indeed, the teeth of the pinion 20 mix air during the rotation of the pinion, which has the effect of forming an air wall which prevents the oil passage towards the axial inlets 14.

FIG. 3 schematically illustrates the airflow reoriented by a vortex inhibitor 60 housed in the hollow shaft 11, in order to avoid a rotating of the airflow or vortex which would generate substantial load losses, in particular in high-speed, rotating applications. This inhibitor 60 comprises, for example, a generally cone-shaped body 62 of which the tip is oriented downstream and centred on the axis XX' of the deaerator. Blades 64 extend radially towards the outside from this cone and force the airflow entering into the hollow shaft to flow substantially parallel to the axis XX'. The blades are regularly distributed about the axis XX' and each extend in a substantially radial plane passing through the axis XX'.

Furthermore, according to an advantageous embodiment not represented in the figures, the deaerator comprises an anti-return disc which extends perpendicularly to the outer wall and which partially blocks the axial inlets so as to prevent an oil outlet in the vicinity of the outer wall through the axial inlets. Thus, the oil in the vicinity of the outer wall cannot emerge from the housing through the inlets, because it is blocked by the disc which extends in the vicinity of the outer wall. This disc is, for example, produced by an excrescence of the web of the pinion at the level of the inlets.

The invention is not limited only to the embodiments described in line with the figures. For example, according to other embodiments not represented, the metal foams can have other geometries inside compartments of the housing without questioning the principle of the invention, which is to provide metal foams inside the housing which extend only partially inside the housing along the axial direction.

The invention claimed is:

1. A centrifugal deaerator for an air/oil mixture of a turbomachine comprising:
    an annular housing for centrifugal separation of said mixture arranged around a hollow shaft extending along an axial direction, and delimited by an outer annular wall and an inner annular wall,
    at least one axial inlet of said air/oil mixture in said housing,
    a pinion for rotating said housing comprising a web securely connected to said inner and outer annular walls such that a rotation of said pinion drives said housing in rotation,
    at least one radial oil outlet arranged in said outer annular wall and configured to evacuate the oil separated from said mixture towards an outside of the deaerator,
    at least one de-oiled air outlet arranged in said inner annular wall and configured to evacuate the de-oiled air towards said hollow shaft,
    a metal foam housed in said housing by extending partially along said axial direction so as to delimit two successive spaces along the axial direction, a foam-free space and a foam-lined space, said foam-free space opening onto said at least one axial inlet.

2. The deaerator according to claim 1, wherein said metal foam presents a variable thickness between the inner annular wall and the outer annular wall of the housing to standardise load losses between zones close to the inner annular wall little subjected to the centrifugal force and zones close to the outer annular wall highly subjected to the centrifugal force.

3. The deaerator according to claim 1, wherein each said de-oiled air outlet is free of metal foam.

4. The deaerator according to claim 1, wherein said housing is formed of a plurality of compartments arranged radially around the hollow shaft, each said compartment being provided with mixture through one of said at least one axial inlets connected to one of said at least one radial oil outlets and to one of said de-oiled air outlets, each compartment comprising two successive spaces along the axial direction, a foam-free space and a foam-lined space, said foam-free space opening onto said at least one axial inlet.

5. The deaerator according to claim 1, wherein a vortex inhibitor is housed in said hollow shaft.

6. The deaerator according to claim 5, wherein the vortex inhibitor comprises flow recovery blades.

7. A turboshaft comprising a mechanical member of the accessory box or reduction gear type, wherein said turboshaft comprises the deaerator according to claim 1, adapted to be driven in rotation by said mechanical member.

* * * * *